United States Patent
Sakai et al.

(10) Patent No.: US 6,674,258 B2
(45) Date of Patent: Jan. 6, 2004

(54) MOTOR DRIVER AND MOTOR DRIVE METHOD

(75) Inventors: Hirofumi Sakai, Nagaokakyo (JP); Tomoharu Yokouchi, Takatsuki (JP); Yasunori Yamamoto, Hirakata (JP); Masashi Inao, Kyoto (JP); Taishi Iwanaga, Nagaokakyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 37 days.

(21) Appl. No.: 10/175,059

(22) Filed: Jun. 20, 2002

(65) Prior Publication Data

US 2002/0195981 A1 Dec. 26, 2002

(30) Foreign Application Priority Data

Jun. 21, 2001 (JP) ........................................ 2001-187605

(51) Int. Cl.[7] .............................................. G05B 11/28
(52) U.S. Cl. ........................ 318/439; 318/254; 318/138; 318/599; 318/801; 318/802; 318/803; 318/804; 318/805; 318/806; 318/807; 318/808; 318/809; 318/810; 318/811
(58) Field of Search ................................ 318/254, 138, 318/439, 599, 801–811

(56) References Cited

U.S. PATENT DOCUMENTS

| | | | | |
|---|---|---|---|---|
| 5,506,487 A | * | 4/1996 | Young et al. | 318/811 |
| 6,002,226 A | * | 12/1999 | Collier-Hallman et al. | 318/439 |
| 6,014,003 A | * | 1/2000 | French | 318/701 |
| 6,081,087 A | * | 6/2000 | Iijima et al. | 318/439 |
| 6,122,579 A | * | 9/2000 | Collier-Hallman et al. | 701/41 |
| 6,400,116 B1 | * | 6/2002 | Chen et al. | 318/599 |

* cited by examiner

Primary Examiner—Rita Leykin
(74) Attorney, Agent, or Firm—McDermott, Will & Emery

(57) ABSTRACT

A motor driver having output circuits each including upper and lower side switching elements connected in series. The motor driver includes: a current detection resistance connected in series with the output circuits in common; a phase switch circuit for turning ON a switching element on one side of one of the output circuits for a time period corresponding to a predetermined electrical angle and switching switching elements on the other side of a plurality of output circuits among the remaining ones of the output circuits; and an ON-period control section for generating a signal for controlling the switching operation so that each of periods obtained by dividing the time period includes a first period in which a plurality of switching elements are turned ON and a second period in which one of the switching elements turned ON in the first period is kept ON.

10 Claims, 15 Drawing Sheets

MOTOR DRIVER AND MOTOR DRIVE METHOD

BACKGROUND OF THE INVENTION

The present invention relates to motor drive technology, and more particularly, to a motor drive technology of a pulse width modulation (PWM) system.

As PWM drive systems for a brushless motor, a triangular wave slicing system and a peak current detecting system are known. In the triangular wave slicing system, a coil current is made to flow through a detection resistance, and the difference between a voltage generated at the detection resistance and a torque command voltage is output as a slice level by an error amplifier. A triangular wave having a constant period is sliced with the slice level, to determine the time period (ON period) during which the current flows to the coil. In the peak current detecting system, which uses no error amplifier, supply of a current to a coil is halted when the voltage generated at the current detection resistance, through which the coil current flows, reaches the torque command voltage, and a regenerative current mode is started.

FIG. 13 is a block diagram of a conventional motor driver of the peak current detecting method. Referring to FIG. 13, Hall sensors 21A, 21B and 21C detect the position of a rotor of a motor 10 and output the detection results to a position detection circuit 22 as Hall sensor outputs S11, S12 and S13, respectively. The position detection circuit 22 determines position signals S21, S22 and S23 based on the Hall sensor outputs S11, S12 and S13, respectively, and outputs the signals to a phase switch circuit 93. The position signals S21, S22 and S23 are signals obtained by shifting the phase of the Hall sensor outputs S11, S12 and S13 by 30°.

The phase switch circuit 93 determines the phases of currents to pass according to the position signals S21, S22 and S23. For easy measurement of the phase currents, the phase switch circuit 93 blocks flow of one of three phase currents. A Logic control circuit 95, set upon receipt of a reference pulse PI, controls supply of currents to the motor 10 by changing the level of signals output to the phase switch circuit 93. The reference pulse PI is a periodical pulse.

FIG. 14 is a graph showing changes with time of phase currents for the motor driven by the motor driver of FIG. 13. In FIG. 14, phase currents I1, I2 and I3 in U, V and W phases, respectively, are shown, and currents flowing from drive transistors 1 to 6 toward the motor 10 are considered positive. As is found from FIG. 14, there is always one phase current that becomes zero, and thus there occurs sharp change of any of the phase currents every electrical angle of 60°.

Assume that the logic control circuit 95 has been set with the reference pulse PI. The phase switch circuit 93 turns ON only the W-phase upper side drive transistor 5 and the U-phase lower side drive transistor 2, for example. In this state, a current flows to a current detection resistance 7 via a W-phase coil 13 and a U-phase coil 11. The magnitude of this current can therefore be detected as the voltage generated at the current detection resistance 7. Since this current flows through the inductive coils, the current gradually increases after the conduction of the drive transistors 2 and 5.

With increase of the current, the voltage generated at the current detection resistance 7 increases, and when it reaches a torque command voltage TI, the level of the output of a comparator 96 changes, causing the logic control circuit 95 to be reset. The reset logic control circuit 95 reverses the level of a signal output to the phase switch circuit 93. On receipt of this signal, the phase switch circuit 93 turns OFF the drive transistor 2.

The time period from the setting of the logic control circuit 95 until the reset thereof corresponds to the on-duty period of switching operation. After the reset of the logic control circuit 95, the current flowing through the coils 11 and 13 still attempts to continue the flow, and this causes a regenerative current to flow through a diode 1D existing between the source and drain of the drive transistor 1. Since the regenerative current does not pass through the current detection resistance 7, the voltage generated at the current detection resistance 7 is zero during the flow of the regenerative current.

The regenerative current gradually decreases. However, upon receipt of the reference pulse PI, the logic control circuit 95 is set again, and the phase switch circuit 93 turns ON the drive transistor 2. This operation is repeated until the phase switch circuit 93 switches the phases of currents to pass. In this way, as a result of the alternate flow of the drive current flowing when the logic control circuit 95 is set and the regenerative current flowing when the logic control circuit 95 is reset, a phase current roughly corresponding to the torque command voltage TI is allowed to flow through a predetermined coil.

FIG. 15 is a graph showing the current detection resistance voltage (motor current detection signal) MC and the V-phase and W-phase currents I2 and I3 at and around time t=tz in FIG. 14, obtained by enlarging the time axis. In FIG. 15, a period T91 is a time period during which a drive current of the U-phase and V-phase currents flows. This drive current flows through the current detection resistance 7. A period T92 is a time period during which the U-phase and V-phase currents flow as a regenerative current. A period T93 is a time period during which a drive current of the U-phase and W-phase currents flows. This drive current flows through the current detection resistance 7. A period T94 is a time period during which the U-phase and W-phase currents flow as a regenerative current.

The conventional motor driver shown in FIG. 13 has the following problem. The phase currents sharply change as shown in FIG. 14. For this reason, when the phase currents are switched, vibration of the motor and generation of electromagnetic noise tend to occur.

To avoid the above problem, the phase currents may be controlled not to change sharply. However, to detect and control a plurality of phase currents, it is necessary to provide current detection resistances in the same number as the number of phases. It is difficult to incorporate the current detection resistances in an integrated circuit. Therefore, as the number of the current detection resistances is greater, the scale of the device is larger and the cost is higher.

In addition, the properties of resistances generally have variations. Therefore, in the case of using current detection resistances for the respective phases, the current detection properties vary every phase. For example, when two phase currents are actually the same in magnitude, the magnitudes of the detected currents may sometimes be different from each other.

SUMMARY OF THE INVENTION

An object of the present invention is providing a motor driver capable of controlling a plurality of phase currents not to change sharply, using one current detection resistance, to reduce vibration of the motor and electromagnetic noise.

The present invention is directed to a motor driver having a plurality of output circuits each including an upper side switching element and a lower side switching element connected in series, for supplying a current to a motor from a connection point between the upper side switching element and the lower side switching element of each output circuit. The motor driver includes: a current detection resistance connected in series with the plurality of output circuits in common for detecting a current supplied to the plurality of output circuits; a position detection section for outputting a position signal corresponding to the position of a rotor of the motor; a phase switch circuit for selecting one switching element of one of the plurality of output circuits according to the position signal and turning ON the selected switching element for a time period corresponding to a predetermined electrical angle, and switching lower side switching elements of a plurality of output circuits among the remaining ones of the plurality of output circuits when the selected switching element is an upper side switching element while switching upper side switching elements of a plurality of output circuits among the remaining ones of the plurality of output circuits when the selected switching element is a lower side switching element; and an ON-period control section for generating a switching control signal for controlling the switching operation by the phase switch circuit according to an input torque command signal and a voltage generated at the current detection resistance so that each of a plurality of periods obtained by dividing the time period corresponding to the predetermined electrical angle includes a first period in which a plurality of switching elements among the switching elements to be switched are turned ON and a second period in which one of the plurality of switching elements turned ON in the first period is kept ON, and outputting the generated signal.

According to the invention, there are provided the first period in which a plurality of switching elements are turned ON and the second period in which one of the plurality of switching elements turned ON in the first period is kept in the ON state. Therefore, a plurality of phase currents can be controlled using one current detection resistance. This enables PWM control with no variation in magnitude of the phase currents. In addition, the phase currents are avoided from sharp change, and thus vibration of the motor and electromagnetic noise during the phase switch can be reduced.

In the motor driver described above, preferably, the ON-period control section includes: a torque signal generation circuit for generating a first target signal corresponding to a target value of a current that should flow to the current detection resistance during the first period, according to the torque command signal, and a second target signal corresponding to a target value of a current that should flow to the current detection resistance during the second period, determined according to the torque command signal and the position signal; a comparator for determining whether or not the voltage generated at the current detection resistance exceeds the output of the torque signal generation circuit and outputting the result; and a logic control circuit for generating the switching control signal according to a reference pulse for defining the period of the switching operation and the output of the comparator and outputting the generated signal, wherein the logic control circuit generates the switching control signal so that the first period is terminated when the comparator determines that the voltage generated at the current detection resistance has exceeded the output of the torque signal generation circuit for the first period and that the second period is terminated when the comparator determines that the voltage generated at the current detection resistance has exceeded the output of the torque signal generation circuit for the second period, and outputs the generated signal. With this configuration, a suitable switching control signal can be generated.

Preferably, the logic control circuit includes: a first latch set with the reference pulse and reset with the output of the comparator; a second latch set with the reference pulse; and a logic circuit receiving the output of the first latch and the output of the comparator for supplying the resultant output to the second latch as a reset input, the logic control circuit outputting the outputs of the first latch and the second latch as the switching control signal, wherein the first latch is reset when the output of the comparator indicates that the voltage generated at the current detection resistance has exceeded the first target signal, the logic circuit outputs the output of the comparator when the output of the first latch indicates that the first latch has been reset, and does not output the output of the comparator when the output of the first latch indicates that the first latch has not been reset, and the second latch is reset when the logic circuit outputs the output of the comparator and the output of the comparator indicates that the voltage generated at the current detection resistance has exceeded the second target signal. Having the logic circuit, the operation of the second latch is ensured, and thus malfunction of the motor driver can be reduced.

Preferably, the logic control circuit further includes a delay circuit for outputting the output of the first latch delayed by a predetermined time, wherein the first latch supplies the output to the logic circuit via the delay circuit. With this configuration, malfunction due to noise at the second latch can be reduced.

In the motor driver described above, preferably, the ON-period control section includes: a torque signal generation circuit for outputting a first target signal corresponding to a target value of a current that should flow to the current detection resistance during the first period, according to the torque command signal, and a second target signal corresponding to a target value of a current that should flow to the current detection resistance during the second period, determined according to the torque command signal and the position signal; a first comparator for determining whether or not the voltage generated at the current detection resistance has exceeded the first target signal and outputting the result; a second comparator for determining whether or not the voltage generated at the current detection resistance has exceeded the second target signal and outputting the result; and a logic control circuit for generating the switching control signal according to a reference pulse for defining the period of the switching operation and the outputs of the first and second comparators and outputting the generated signal, wherein the logic control circuit generates the switching control signal so that the first period is terminated when the first comparator determines that the voltage generated at the current detection resistance has exceeded the first target signal and that the second period is terminated when the second comparator determines that the voltage generated at the current detection resistance has exceeded the second target signal, and outputs the generated signal. With this configuration, since the first and second comparators cause no malfunction easily, stable operation is possible.

Preferably, the logic control circuit includes: a first latch set with the reference pulse and reset with the output of the first comparator; a second latch set with the reference pulse; and a logic circuit receiving the output of the first latch and the output of the second comparator for supplying the resultant output to the second latch as a reset input, the logic control circuit outputting the outputs of the first and second latches as the switching control signal, wherein the first latch is reset when the output of the first comparator indicates that the voltage generated at the current detection resistance has exceeded the first target signal, the logic circuit outputs the output of the second comparator when the output of the first latch indicates that the first latch has been reset, and does not output the output of the second comparator when the output of the first latch indicates that the first latch has not been reset, and the second latch is reset when the logic circuit outputs the output of the second comparator and the output of the second comparator indicates that the voltage generated at the current detection resistance has exceeded the second target signal. Having the logic circuit, the operation of the second latch is ensured, and thus malfunction of the motor driver can be reduced.

Preferably, the period of the reference pulse is roughly constant. With this configuration, the period of the timing at which the drive transistors are turned ON is made constant. This makes it easy to take a measure for reducing influence of noise generated by the switching.

Preferably, the torque signal generation circuit uses a voltage corresponding to the torque command signal as the first target signal, and generates a sawtooth wave having a period equal to the time period corresponding to the predetermined electrical angle and having a peak value roughly equal to the first target signal based on the position signal and the first target signal and uses the sawtooth wave as the second target signal. Having these signals, the waveform of the phase currents can be made roughly trapezoidal, and thus sharp change of the phase currents is avoided.

Preferably, the ON-period control section generates a signal for controlling the switching operation so that the switching element to be kept ON in the second period among the plurality of switching elements to be turned ON in the first period is kept OFF until a lapse of a predetermined time after start of the first period, and outputs the signal as the switching control signal. This prevents currents of two phases from starting to flow simultaneously, and thus influence of switching noise is suppressed.

The present invention is also directed to a motor drive method for a motor driver having a plurality of output circuits each including an upper side switching element and a lower side switching element connected in series, and a current detection resistance connected in series with the plurality of output circuits in common for detecting a current supplied to the plurality of output circuits, the motor driver supplying a current to a motor from a connection point between the upper side switching element and the lower side switching element of each output circuit. The motor drive method includes the steps of: determining a position signal corresponding to the position of a rotor of the motor; selecting one switching element of one of the plurality of output circuits according to the position signal and turning ON the selected switching element for a time period corresponding to a predetermined electrical angle; and switching lower side switching elements of a plurality of output circuits among the remaining ones of the plurality of output circuits when the selected switching element is an upper side switching element while switching upper side switching elements of a plurality of output circuits among the remaining ones of the plurality of output circuits when the selected switching element is a lower side switching element, the switching operation being controlled according to an input torque command signal and a voltage generated at the current detection resistance so that each of a plurality of periods obtained by dividing the time period corresponding to the predetermined electrical angle includes a first period in which a plurality of switching elements among the switching elements to be switched are turned ON and a second period in which one of the plurality of switching elements turned ON in the first period is kept ON.

DESCRIPTION OF THE PREFERRED EMBODIMENTS

Hereinafter, preferred embodiments of the present invention will be described with reference to the accompanying drawings.

Embodiment 1

Figure 1:
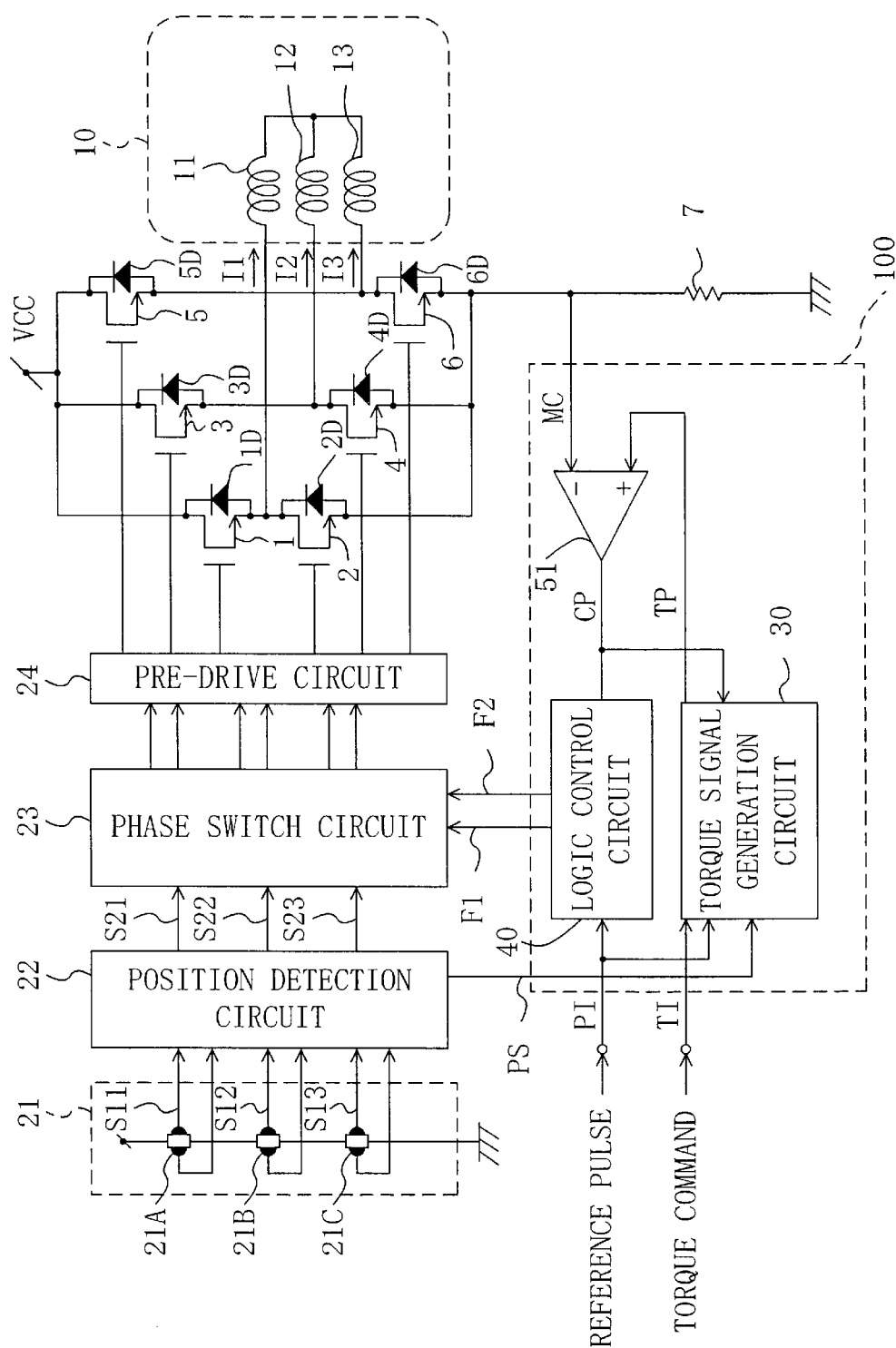
FIG. 1 is a block diagram of a motor driver of Embodiment 1 of the present invention.

FIG. 1 is a block diagram of a motor driver of Embodiment 1 of the present invention. The motor driver of FIG. 1 includes U-phase, V-phase and W-phase upper side drive transistors 1, 3 and 5, U-phase, V-phase and W-phase lower side drive transistors 2, 4 and 6, diodes 1D, 2D, 3D, 4D, 5D and 6D, a current detection resistance 7, a Hall sensor circuit 21, a position detection circuit 22, a phase switch circuit 23, a pre-drive circuit 24, a torque signal generation circuit 30, a logic control circuit 40 and a comparator 51. A motor includes a U-phase coil 11, a V-phase coil 12 and a W-phase coil 13. The torque signal generation circuit 30, the logic control circuit 40 and the comparator 51 constitute an ON-period control section 100. The Hall sensor circuit 21 and the position detection circuit 22 constitute a position detection section.

N-type metal oxide semiconductor (MOS) transistors are used as the drive transistors 1 to 6 in this embodiment. The anode and cathode of the diode 1D are connected to the source and drain of the drive transistor 1, respectively.

Likewise, the diodes 2D to 6D are connected to the drive transistors 2 to 6, respectively, in the same manner. The drains of the drive transistors 1, 3 and 5 are connected to the power supply VCC, and the sources of the drive transistors 2, 4 and 6 are connected to one terminal of the current detection resistance 7. The other terminal of the current detection resistance 7 is grounded. The drive transistors 1 to 6 operate as switching elements. The drive transistors 1 and 2 and the diodes 1D and 2D operate as a U-phase output circuit, the drive transistors 3 and 4 and the diodes 3D and 4D operate as a V-phase output circuit, and the drive transistors 5 and 6 and the diodes 5D and 6D operate as a W-phase output circuit.

The source of the drive transistor 1 is connected to the drain of the drive transistor 2 and also connected to one terminal of the U-phase coil 11 of the motor 10. The source of the drive transistor 3 is connected to the drain of the drive transistor 4 and also connected to one terminal of the V-phase coil 12 of the motor 10. The source of the drive transistor 5 is connected to the drain of the drive transistor 6 and also connected to one terminal of the W-phase coil 13 of the motor 10. The other terminals of the U-phase coil 11, the V-phase coil 12 and the W-phase coil 13 are connected to one another.

Herein, the current flowing from the drive transistors 1 and 2 toward the U-phase coil 11 is called a U-phase current I1. Likewise, the current flowing from the drive transistors 3 and 4 toward the V-phase coil 12 is called a V-phase current I2, and the current flowing from the drive transistors 5 and 6 toward the W-phase coil 13 is called a W-phase current I3. Also, currents flowing from the drive transistors 1 to 6 toward the coils 11 to 13 are called source currents, while currents in the opposite direction are called sink currents. The direction of the source currents is assumed as the positive direction for all the phase currents. The coils 11 to 13 of the motor 10 are in Y connection. Therefore, the respective phase currents are equal to currents flowing through the corresponding coils.

The Hall sensor circuit 21 includes Hall sensors 21A, 21B and 21C, which detect the position of a rotor of the motor 10 and output the detection results to the position detection circuit 22 as Hall sensor outputs S11, S12 and S13, respectively. The position detection circuit 22 determines position signals S21, S22, S23 and PS based on the Hall sensor outputs S11, S12 and S13, and outputs the signals S21, S22 and S23 to the phase switch circuit 23 and the signal PS to the torque signal generation circuit 30.

The torque signal generation circuit 30 generates a voltage signal TP corresponding to a target value of a current to flow to the current detection resistance 7 based on the position signal PS, a torque command voltage (torque command signal) TI, a reference pulse PI and an output CP of the comparator 51, and outputs the signal TP to the positive input terminal of the comparator 51. A voltage generated at the current detection resistance 7 (source potential at the drive transistors 2, 4 and 6) is input into the negative input terminal of the comparator 51 as a motor current detection signal MC. The comparator 51 supplies the output CP to the torque signal generation circuit 30 and the logic control circuit 40. The logic control circuit 40, which also receives the reference pulse PI, generates switching control signals F1 and F2 for defining the time period during which the drive transistors 1 to 6 are kept ON, and outputs the signals to the phase switch circuit 23.

The phase switch circuit 23 selects any of the drive transistors 1 to 6 to be turned ON based on the position signals S21, S22 and S23 and the control signals F1 and F2, and sends instructions to the pre-drive circuit 24. The pre-drive circuit 24 outputs signals to the gates of the drive transistors 1 to 6 according to the outputs of the phase switch circuit 23, to control ON/OFF of the drive transistors 1 to 6.

Figure 2:
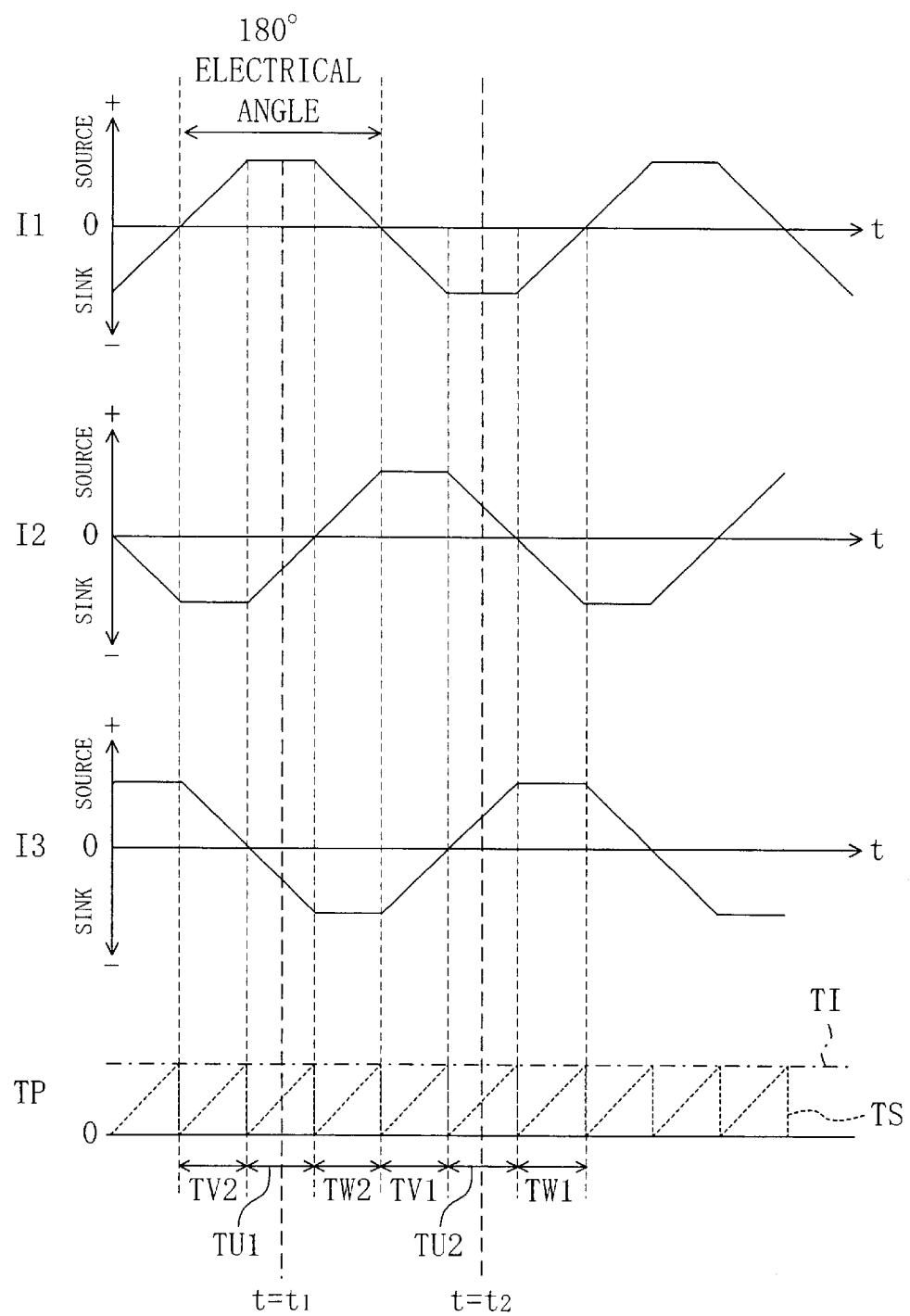
FIG. 2 is a graph showing target waveforms for respective phase currents for a motor.

FIG. 2 is a graph showing target waveforms for the phase currents I1 to I3 for the motor 10. The motor driver of FIG. 1 controls supply of currents to the motor 10 as shown in FIG. 2 so that the phase currents I1 to I3 for the motor 10 are prevented from sharp change. The motor driver of FIG. 1 divides the electrical angle 360° of the motor 10 into six, for example, and switches the phases of currents to pass every time period corresponding to the divided electrical angle, that is, every rotation of the rotor of the motor 10 by the angle corresponding to the divided electrical angle, to control the currents to the motor 10.

For example, a period TU1 in FIG. 2 is a time period corresponding to the electrical angle 60°. During the period TU1, the U-phase current I1 is a source current having a roughly constant magnitude. The V-phase current I2 is a sink current of which the magnitude gradually decreases with time t. The W-phase current I3 is a sink current of which the magnitude gradually increases with time t. To attain this state, during the period TU1, control is performed as follows. The U-phase upper side drive transistor 1 is continuously kept ON. The V-phase and W-phase lower side drive transistors 4 and 6 are switched so that the V-phase current I2 and the W-phase current I3 behave as shown in FIG. 2, controlling the ON/OFF periods of the drive transistors 4 and 6.

Figure 3:
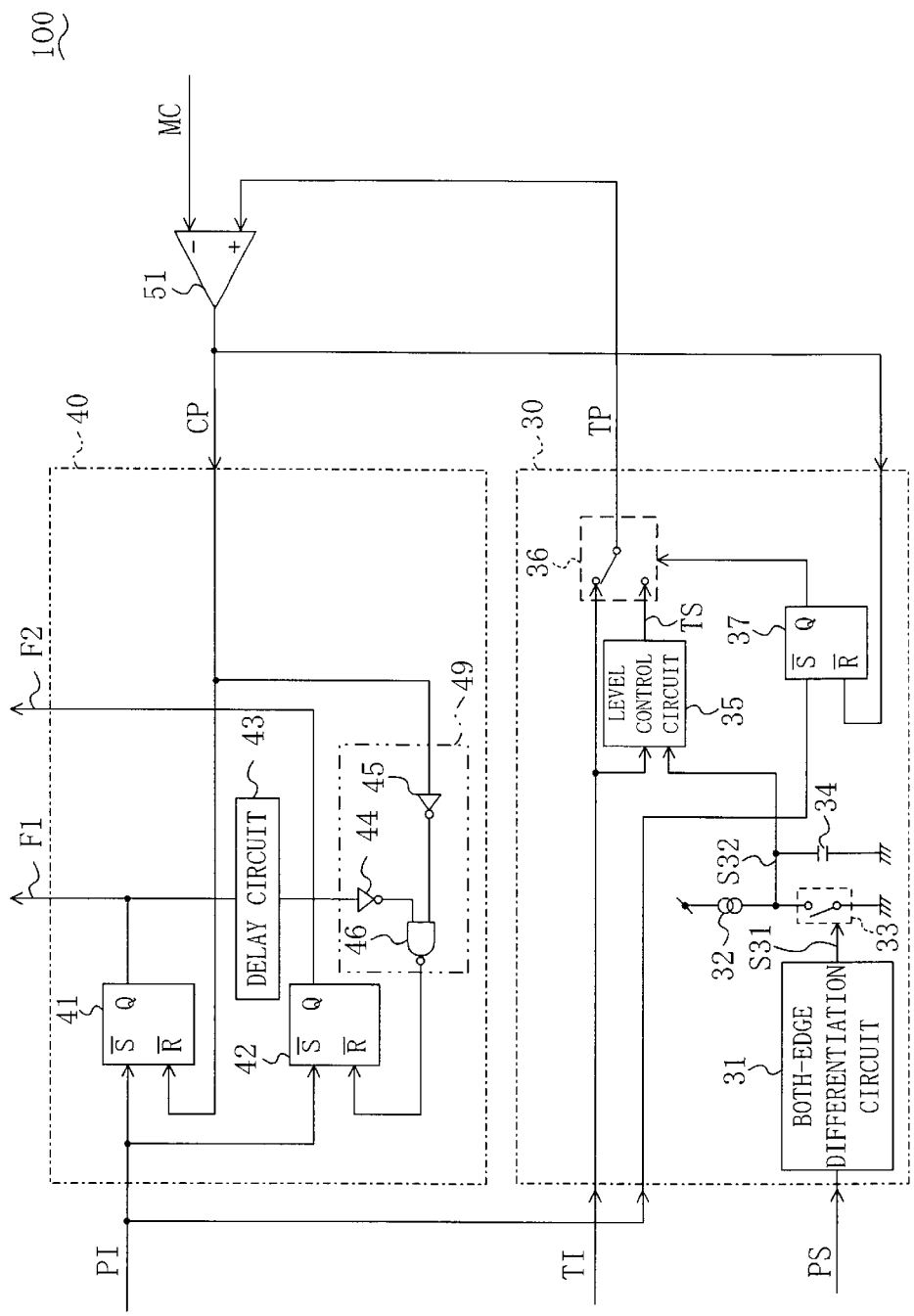
FIG. 3 is a block diagram of an example of an ON-period control section in FIG. 1.

FIG. 3 is a block diagram of an example of the ON-period control section 100 in FIG. 1, including the torque signal generation circuit 30, the logic control circuit 40 and the comparator 51. The torque signal generation circuit 30 in FIG. 3 includes a both-edge differentiation circuit 31, a constant-current source 32, switches 33 and 36, a capacitor 34, a level control circuit 35 and a RS flipflop 37. The logic control circuit 40 in FIG. 3 includes a RS flipflop 41 as the first latch, a RS flipflop 42 as the second latch, a delay circuit 43, inverters 44 and 45 and a NAND gate 46. The inverters 44 and 45 and the NAND gate 46 operate as a logic circuit 49.

Figure 4:
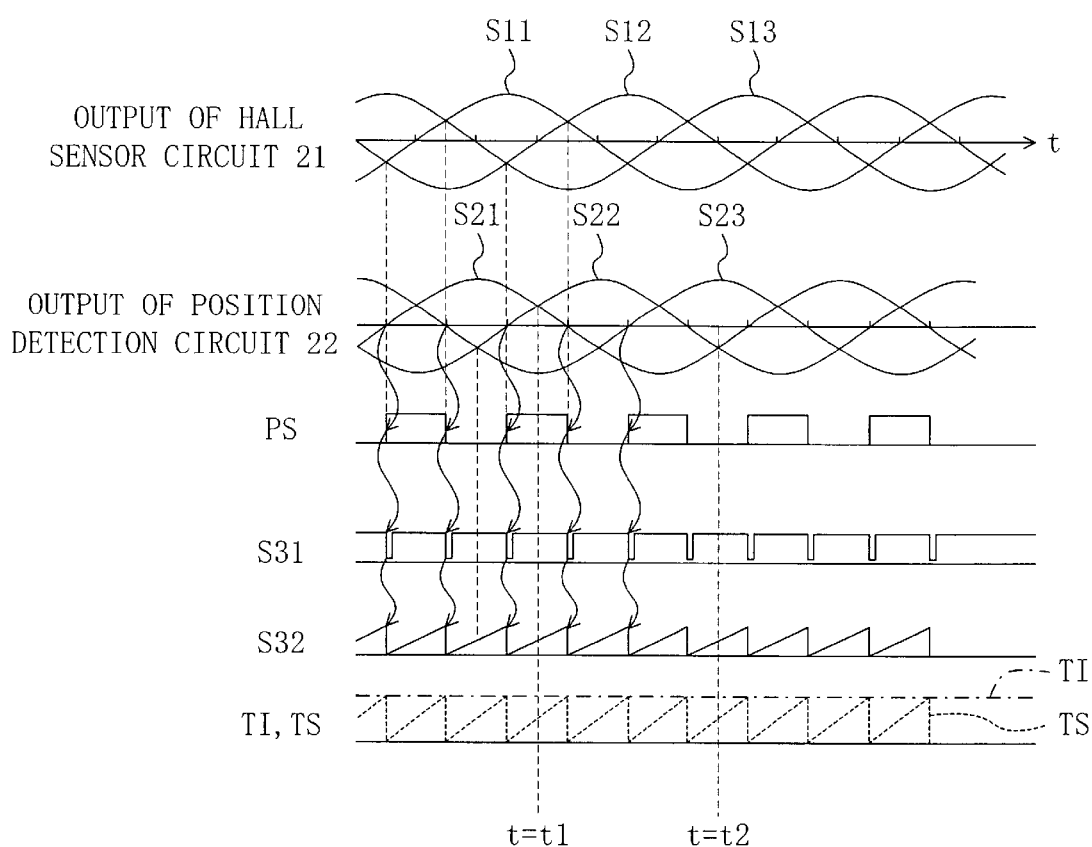
FIG. 4 is a graph showing signals related to a position detection circuit and a torque signal generation circuit.

FIG. 4 is a graph showing signals related to the position detection circuit 22 and the torque signal generation circuit 30. The position detection circuit 22 determines the position detection signal S21 indicating the position of the rotor of the motor 10 based on the Hall sensor outputs S11 and S12. Herein, assume that the position detection signal S21 represents the difference between the Hall sensor outputs S11 and S12 (S21=S11−S12). The Hall sensor outputs S11 and S12 are approximate sine waves. When the phase of the Hall sensor output S11 is ahead of that of the Hall sensor output S12 by 120°, the phase of the position detection signal S21 is ahead of that of the Hall sensor output S11 by 30°. Likewise, the position detection circuit 22 determines the position detection signals S22 and S23 from S22=S12−S13 and S23=S13−S11, for example.

The position detection circuit 22 determines the position detection signal PS based on the determined position detection signals S21, S22 and S23. The position detection signal PS is a signal having a pulse rising when the position detection signal S21 changes from negative to positive and falling when the position detection signal S23 changes from positive to negative, a pulse rising when the position detection signal S22 changes from negative to positive and falling when the position detection signal S21 changes from positive to negative, and a pulse rising when the position detection signal S23 changes from negative to positive and falling when the position detection signal S22 changes from positive to negative, repeatedly. The timing of the edges of the position detection signal PS matches with the timing at which the waveforms of the Hall sensor outputs S11, S12 and S13 cross with each other as shown in FIG. 4.

The operation of the torque signal generation circuit 30 will be described with reference to FIGS. 3 and 4. The position signal PS is input into the both-edge differentiation circuit 31 from the position detection circuit 22. The both-edge differentiation circuit 31 outputs a reset pulse signal S31 to the switch 33 as the control signal. The reset pulse signal S31 is kept "L" for a constant time period when an edge of the position signal PS is detected and otherwise kept "H" ("H" and "L" represent logical high and low potentials, respectively).

The capacitor 34 is connected to the output of the constant-current source 32 and grounded via the switch 33 at one terminal, and grounded at the other terminal. The capacitor 34 is charged with a current output from the constant-current source 32, and the switch 33 is ON only when the reset pulse signal S31 is "L", permitting discharge of the capacitor 34. Thus, a voltage S32 at the capacitor 34 has the shape of a sawtooth wave as shown in FIG. 4.

The level control circuit 35 receives the torque command voltage TI and the voltage S32, generates a signal TS by multiplying the voltage S32 by a gain so that the peak of the voltage S32 is equal to the torque command voltage TI, and outputs the signal TS to the switch 36. The switch 36 selects either the torque command voltage TI as the first target signal or the signal TS as the second target signal according to the output of the RS flipflop 37, and outputs the selection result to the comparator 51 as a signal TP. The RS flipflop 37 is set with the reference pulse PI and reset with the output of the comparator 51. Accordingly, the switch 36 outputs the signal TI and the signal TS alternately as the signal TP (see FIGS. 3 and 5).

Figure 5:
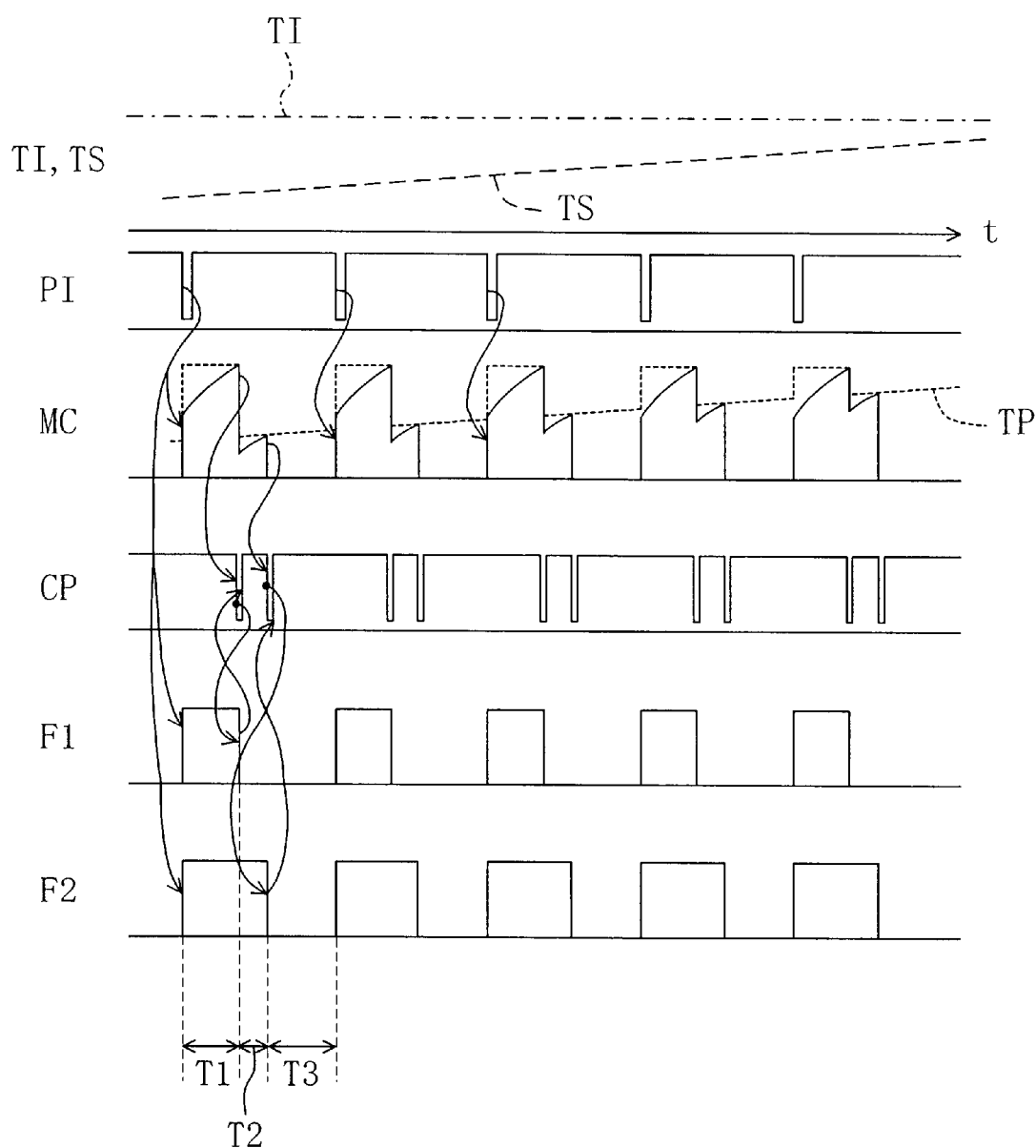
FIG. 5 is a graph showing signals input/output into/from a logic control circuit and a comparator in FIG. 1.
Figure 6:
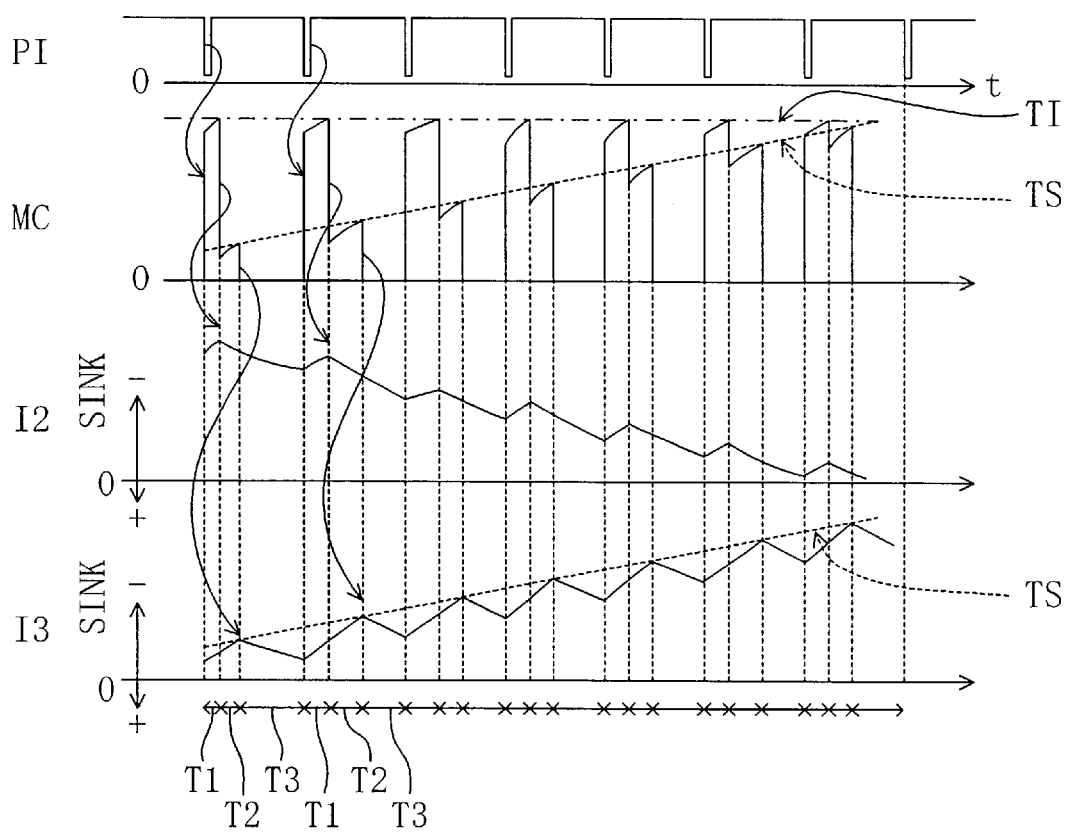
FIG. 6 is a graph showing phase currents in the motor driver of FIG. 1.

FIG. 5 is a graph of input/output signals for the logic control circuit 40 and the comparator 51 in FIG. 1. FIG. 6 is a graph showing phase currents in the motor driver of FIG. 1. FIGS. 5 and 6 show areas at and around time t=t1 in FIGS. 2 and 4 in an enlarged manner.

The operation of the logic control circuit 40 and the currents flowing to the motor 10 will be described with reference to FIGS. 3, 5 and 6. As shown in FIG. 5, the reference pulse PI is a pulse signal having a roughly constant period, and this period is the reference period for the PWM control.

The reference pulse PI is input into the set terminals of the RS flipflops 37, 41 and 42 shown in FIG. 3. Upon falling of the reference pulse PI, the RS flipflop 37 is set, turning the output to "H". Receiving the "H" output, the switch 36 selects the torque command voltage TI and outputs this to the comparator 51 as the signal TP. The RS flipflop 41 and 42 are also set, turning both the signals F1 and F2 to "H".

Assume that the phase switch circuit 23 determines that the operation is currently in the period TU1 in FIG. 2 based on the position signals S21, S22 and S23. As shown in FIG. 2, the period TU1 is a time period during which the U-phase current I1 is a source current having a roughly constant magnitude. Since the U-phase current I1 is the only source current in the period TU1, the phase switch circuit 23 puts the drive transistor 1 in the continuous ON state. The V-phase and W-phase currents I2 and I3 are sink currents and the magnitudes thereof must be changed. Therefore, the phase switch circuit 23 switches the drive transistors 4 and 6 according to the control signals F1 and F2. During the period TU1, the phase switch circuit 23 turns ON the drive transistor 4 when the control signal F1 becomes "H", and turns ON the drive transistor 6 when the control signal F2 becomes "H". The drive transistors 2, 3 and 5 are put in the OFF state.

When both the control signals F1 and F2 become "H", the phase switch circuit 23 turns ON the drive transistors 4 and 6 (first period T1). In this state, a current flows from the drive transistor 1 toward the U-phase coil 11 as a source current. The current flowing through the U-phase coil 11 branches to the V-phase coil 12 and the W-phase coil 13, and the branched currents flow toward the drive transistors 4 and 6, respectively, as sink currents.

In the above state where both the drive transistors 4 and 6 are ON simultaneously, both the V-phase current I2 and the W-phase current I3 flowing through the V-phase coil 12 and the W-phase coil 13 flow to the current detection resistance 7. The magnitude of the current flowing through the current detection resistance 7 is equal to that of the U-phase current I1 flowing through the U-phase coil 11. At the current detection resistance 7, generated is a voltage proportional to the magnitude of the current flowing through the current detection resistance 7, and the generated voltage is input into the negative input terminal of the comparator 51 as the motor current detection signal MC.

Because the U-phase coil 11, the V-phase coil 12 and the W-phase coil 13 are inductive loads, the V-phase current I2 and the W-phase current I3 gradually increase during the period T1 after the conduction of the drive transistors 4 and 6 (see FIG. 6). This also gradually increases the motor current detection signal MC. Once the voltage of the motor current detection signal MC reaches the voltage of the signal TP (see FIG. 5), the comparator 51 changes the output CP to "L". This causes the flipflop 41 to be reset and reverse the output thereof to "L". The control signal F1 therefore becomes "L", and the time shifts to the second period T2.

During the period T2, the control signals F1 and F2 are "L" and "H", respectively. Therefore, the phase switch circuit 23 turns OFF the drive transistor 4, while keeping ON the drive transistor 6. With the drive transistor 4 turned OFF, a regenerative current from the V-phase coil 12 flows through the diode 3D, connected between the source and drain of the drive transistor 3, and the drive transistor 1. This V-phase current I2 flowing as a regenerative current gradually decreases (see FIG. 6). During this period, only the current flowing through the W-phase coil 13 flows to the current detection resistance 7. This enables detection of the current flowing through the W-phase coil 13 without influence of the current flowing through the V-phase coil 12.

At the shift to the period T2, the level of the signal TP input into the positive input terminal of the comparator 51 decreases to the voltage of the signal TS (bottom level). However, since the current flowing through the V-phase coil 12 stops flowing to the current detection resistance 7, the level of the motor current detection signal MC also decreases and becomes lower than the bottom level of the signal TP. At this point, the output CP of the comparator 51 resumes "H" (see FIG. 5).

At the shift to the period T2, also, the output of the delay circuit 43 follows the control signal F1 and changes to "L" after a lapse of a preset time, and this changes the output of the inverter 44 to "H". The output of the NAND gate 46 is "H" as long as the output of the inverter 44 is "L", and thus the RS flipflop 42 is not reset irrespective of a change of the output CP of the comparator 51. The RS flipflop 42 is reset only when the output of the delay circuit 43 changes to "L" and thereafter the output of the comparator 51 becomes "L" turning the output of the inverter 45 to "H".

During the period T2, the drive transistors 1 and 6 are kept ON. Therefore, the current flowing through the W-phase coil 13 continues increasing (see FIG. 6), and thus the current flowing to the current detection resistance 7 also continues increasing. The voltage of the motor current detection signal MC therefore increases, and when it reaches the voltage of the signal TP output from the torque signal generation circuit 30, the comparator 51 changes the output CP to "L". This causes the RS flipflop 42 to be reset, and turns the control signal F2 to "L". The operation then shifts to period T3.

During the period T3, in which both the control signals F1 and F2 are "L", the phase switch circuit 23 turns OFF the drive transistors 4 and 6.

As described above, the drive transistor 4 is ON when the control signal F1 is "H", and the drive transistor 6 is ON when the control signal F2 is "H". During the period T1 in which both the control signals F1 and F2 are "H", the sum of the currents flowing through the V-phase coil 12 and the W-phase coil 13 is controlled to be a value corresponding to the signal TP. During the period T2 in which the control signals F1 and F2 are "L" and "H", respectively, the current flowing through the W-phase coil 13 is controlled to be a value corresponding to the signal TP. In other words, out of the drive transistors of the two phases (V phase and W phase) switched during the period TU1, the drive transistor 4 of the phase for which the current should be decreased during the period TU1 is turned OFF first (see FIG. 2).

During the period T3 in which both the control signals F1 and F2 are "L", only regenerative currents flow through the coils 11 to 13. The V-phase current I2 and the W-phase current I3 flowing as regenerative currents gradually decrease (see FIG. 6). Once the reference pulse PI is input into the torque signal generation circuit 30 and the logic control circuit 40, both the control signals F1 and F2 become "H" again, and the operation described above is repeated.

The logic control circuit 40 may not include the delay circuit 43 when it is ensured that no malfunction occurs due to switching noise at the drive transistors 1 to 6.

Figure 7:
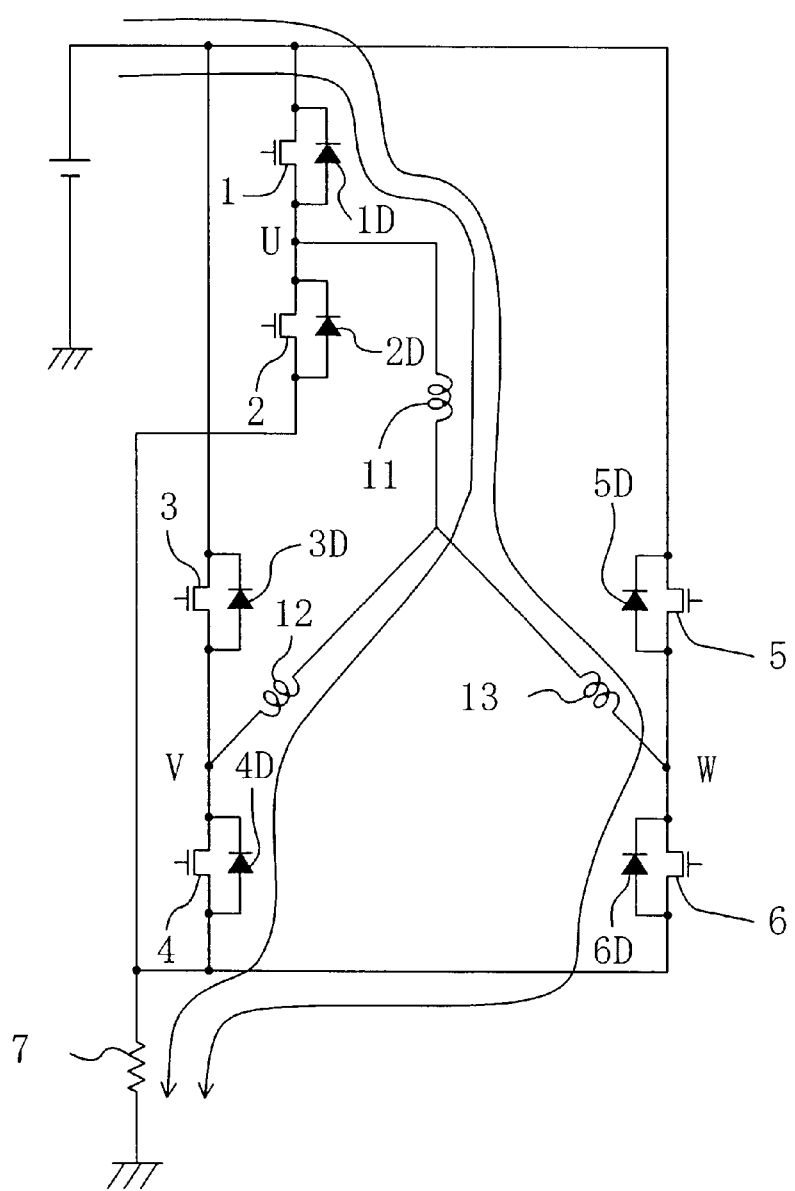
FIG. 7 is an illustration of routes of currents flowing through the motor during a period T1.

FIG. 7 is an illustration of routes of the currents flowing to the motor 10 during the period T1. Referring to FIG. 7, during the period T1, the V-phase current I2 flowing through the V-phase coil 12 follows the route from the power supply through the drive transistor 1, the U-phase coil 11, the V-phase coil 12, the drive transistor 4 and the current detection resistance 7. The W-phase current I3 flowing through the W-phase coil 13 follows the route from the power supply through the drive transistor 1, the U-phase coil 11, the W-phase coil 13, the drive transistor 6 and the current detection resistance 7. Therefore, the sum of the V-phase current I2 and the W-phase current I3 can be detected from the voltage generated at the current detection resistance 7.

Figure 8:
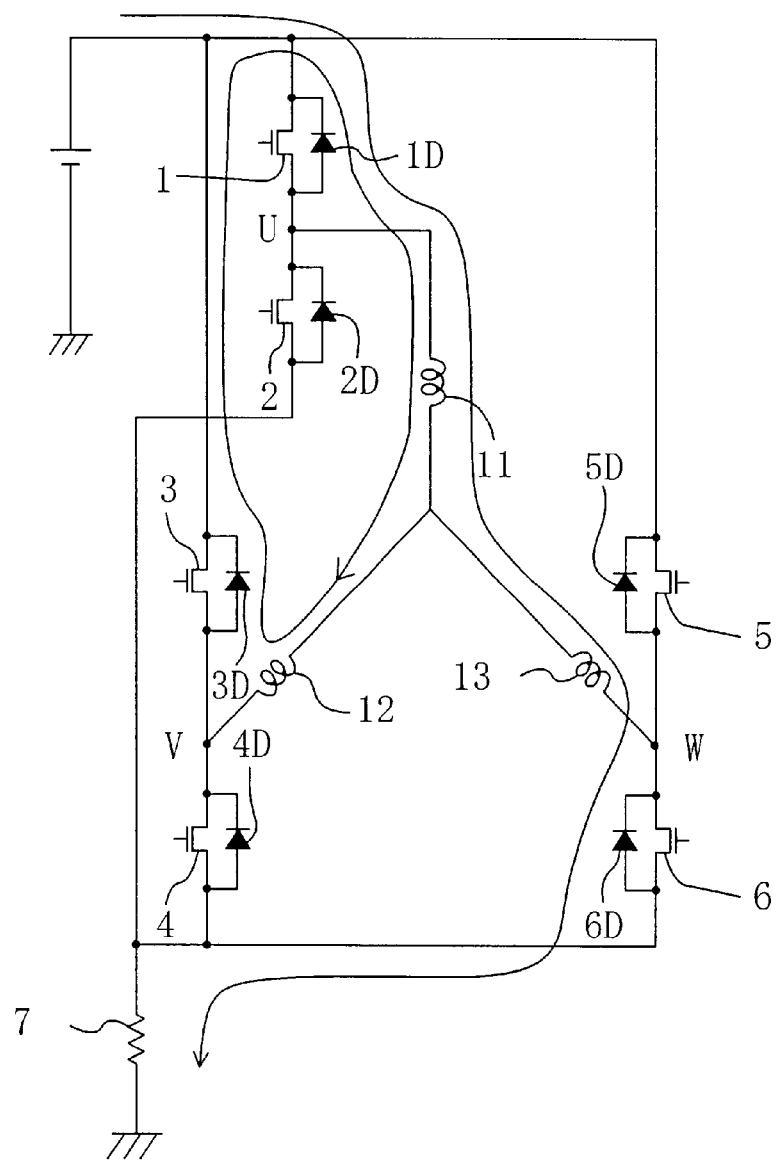
FIG. 8 is an illustration of routes of currents flowing through the motor during a period T2.

FIG. 8 is an illustration of routes of the currents flowing to the motor 10 during the period T2. Referring to FIG. 8, during the period T2, the V-phase current I2 flowing through the V-phase coil 12 is a regenerative current flowing in a loop through the drive transistor 1, the U-phase coil 11, the V-phase coil 12 and the diode 3D. The W-phase current I3 flowing through the W-phase coil 13 follows the route, as in FIG. 7, from the power supply through the drive transistor 1, the U-phase coil 11, the W-phase coil 13, the drive transistor 6 and the current detection resistance 7. Therefore, only the W-phase current I3 can be detected from the voltage generated at the current detection resistance 7.

Figure 9:
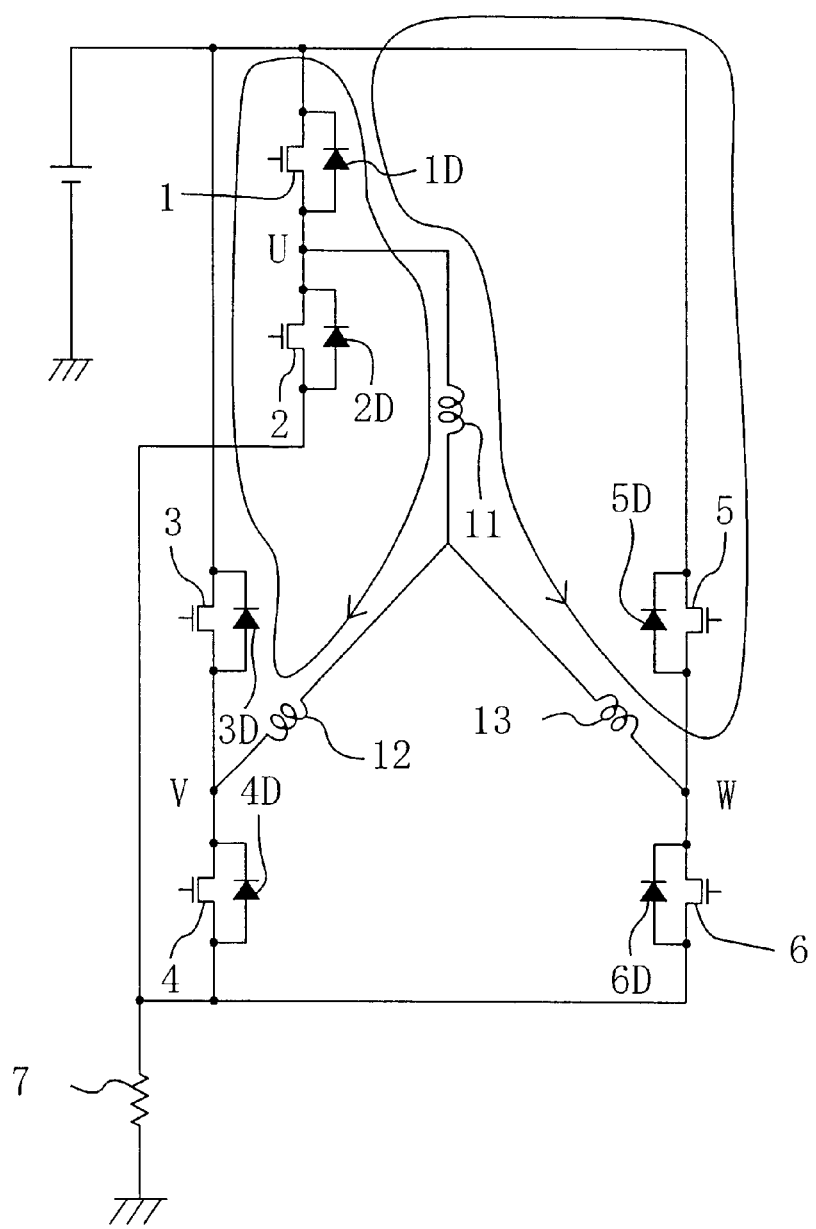
FIG. 9 is an illustration of routes of currents flowing through the motor during a period T3.

FIG. 9 is an illustration of routes of the currents flowing to the motor 10 during the period T3. Referring to FIG. 9, during the period T3, the V-phase current I2 flowing through the V-phase coil 12 is a regenerative current flowing in a loop as in FIG. 8. The W-phase current I3 flowing through the W-phase coil 13 is also a regenerative current flowing in a loop through the drive transistor 1, the U-phase coil 11, the W-phase coil 13 and the diode 5D. Therefore, no current flows to the current detection resistance 7. As described above, two types of currents, that is, a drive current flowing by the conduction of a drive transistor of the output circuit for a phase, and a regenerative current flowing via a diode of the output circuit for the phase, flow alternately through the corresponding one of the coils 11 to 13.

Next, the operation of the motor driver of FIG. 1 during a period TU2 in FIG. 2 will be described. During the period TU2, the U-phase current It is a sink current having a roughly constant magnitude. Since the U-phase current I1 is the only sink current in the period TU2, the phase switch circuit 23 puts the drive transistor 2 in the continuous ON state. The V-phase and W-phase currents I2 and I3 are source currents and the magnitudes thereof must be changed. Therefore, the phase switch circuit 23 switches the drive transistors 3 and 5. During the period TU2, the phase switch circuit 23 turns ON the drive transistor 3 when the control signal F1 becomes "H", and turns ON the drive transistor 5 when the control signal F2 becomes "H". The drive transistors 1, 4 and 6 are put in the OFF state.

When both the control signals F1 and F2 become "H", the phase switch circuit 23 turns ON the drive transistors 3 and 5. When the control signals F1 and F2 are "L" and "H", respectively, the drive transistor 3 is turned OFF. When both the control signals F1 and F2 are "L", the drive transistor 5 is also turned OFF.

As a result, during the period TU2, the directions of the flows of the U-phase current I1, the V-phase current I2 and the W-phase current I3 are reverse to those of the flows during the period TU1. The other aspects are substantially the same as those during the period TU1, and thus detailed description is omitted here.

The operations of the motor driver of FIG. 1 during periods TV1 and TW1 are the same as that during the period TU1, except for the following. During the period TV1 in which the V-phase current I2 is a source current having a roughly constant magnitude, the phase switch circuit 23 puts the drive transistor 3, in place of the drive transistor 1, in the continuous ON state. Also, the phase switch circuit 23 switches the drive transistors 6 and 2, in place of the drive transistors 4 and 6, respectively, and puts the drive transistors 1, 4 and 5 in the OFF state.

During the period TW1 in which the W-phase current I3 is a source current having a roughly constant magnitude, the phase switch circuit 23 puts the drive transistor 5, in place of the drive transistor 1, in the continuous ON state. Also, the phase switch circuit 23 switches the drive transistors 2 and 4, in place of the drive transistors 4 and 6, respectively, and puts the drive transistors 1, 3 and 6 in the OFF state.

The operations of the motor driver of FIG. 1 during periods TV2 and TW2 are the same as that during the period TU2, except for the following. During the period TV2 in which the V-phase current I2 is a sink current having a roughly constant magnitude, the phase switch circuit 23 puts the drive transistor 4, in place of the drive transistor 2, in the continuous ON state. Also, the phase switch circuit 23 switches the drive transistors 5 and 1, in place of the drive transistors 3 and 5, respectively, and puts the drive transistors 2, 3 and 6 in the OFF state.

During the period TW2 in which the W-phase current I3 is a sink current having a roughly constant magnitude, the phase switch circuit 23 puts the drive transistor 6, in place of the drive transistor 2, in the continuous ON state. Also, the phase switch circuit 23 switches the drive transistors 1 and 3, in place of the drive transistors 3 and 5, respectively, and puts the drive transistors 2, 4 and 5 in the OFF state.

Figure 10:
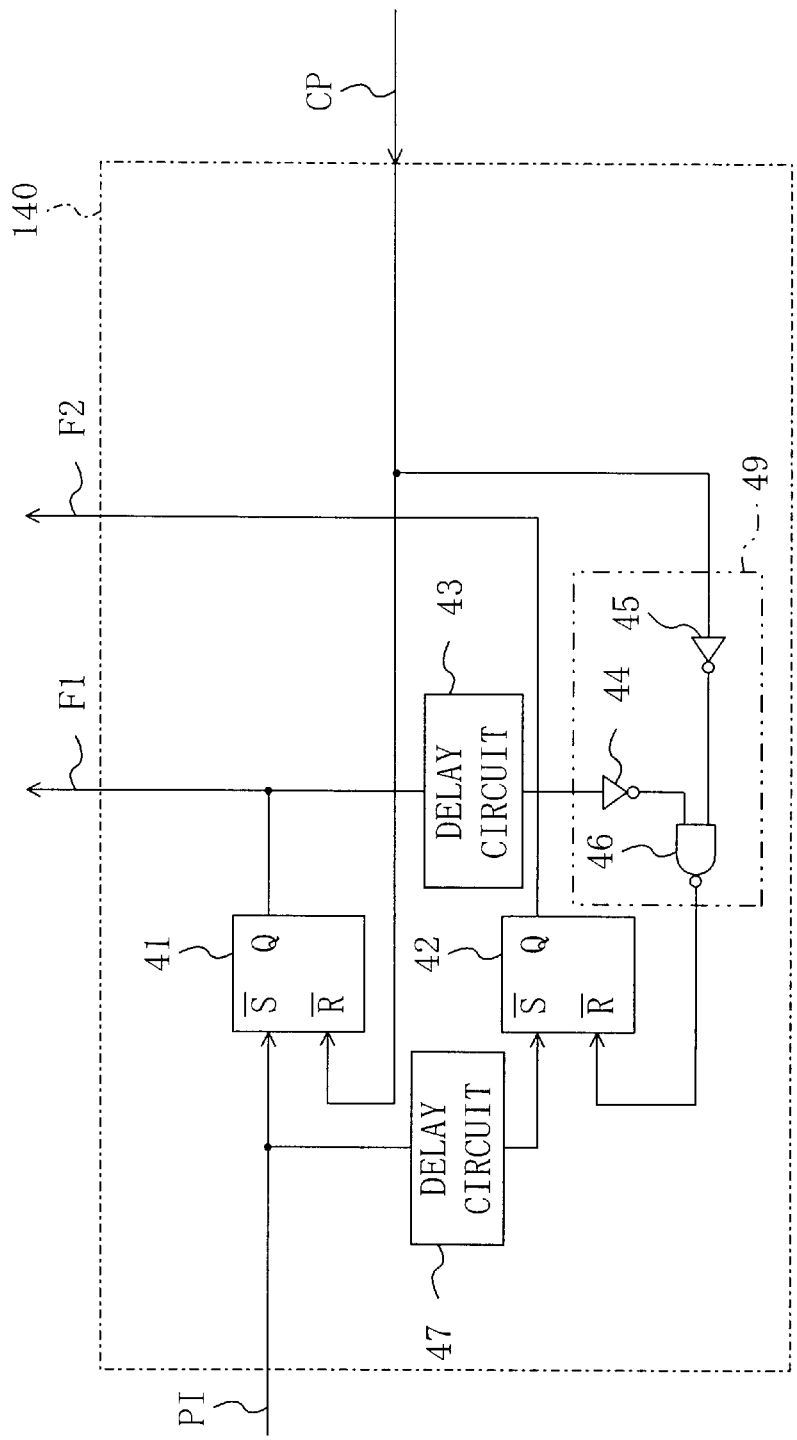
FIG. 10 is a block diagram of another example of the logic control circuit in FIG. 1.

FIG. 10 is a block diagram of another example of the logic control circuit in FIG. 1. The logic control circuit of FIG. 10, denoted by 140, includes a delay circuit 47 in addition to the components of the logic control circuit 40. The delay circuit 47 receives the reference pulse PI, and outputs the reference pulse PI delayed by a predetermined time to the set input terminal of the RS flipflop 42.

By use of the logic control circuit 140 of FIG. 10, in place of the logic control circuit 40 in FIG. 3, after the lapse of the predetermined time from the setting of the RS flipflop 41 and the change of the control signal F1 to "H", the RS flipflop 42 is set and the control signal F2 is changed to "H". Thus, the control signals F1 and F2 are prevented from changing from "L" to "H" simultaneously.

For example, during the period TU1, the drive transistor 4 is first turned ON to allow the V-phase current I2 to flow, and after the lapse of the predetermined time, the drive transistor 6 is turned ON to allow the W-phase current I3 to flow. This avoids such a trouble that switching noise occurring when two phase currents start flowing simultaneously may be superposed on the ground line, resulting in that the voltage at the current detection resistance 7 exceeds the target value from the start. In addition, the possibility of malfunction of the RS flipflop 42 due to switching noise of a drive transistor can be reduced. The delay circuit 47 is not necessarily required if measures for reducing the wiring resistance of the ground line and the like are taken.

As described above, according to the motor driver of this embodiment, the phase currents I1 to I3 for the motor 10 can be controlled to have a roughly trapezoidal waveform having an amplitude corresponding to the torque command voltage TI as shown in FIG. 2. Therefore, the changes of the phase currents at the phase switches can be made mild.

In PWM control of three phase currents, three current detection resistances are normally required. In the motor driver of this embodiment, however, the three phase currents can be controlled with only one current detection resistance, and thus PWM control without a variation in magnitude of the phase currents is possible. In addition, with the reduced number of current detection resistances, the scale of the device can be reduced.

Embodiment 2

Figure 11:
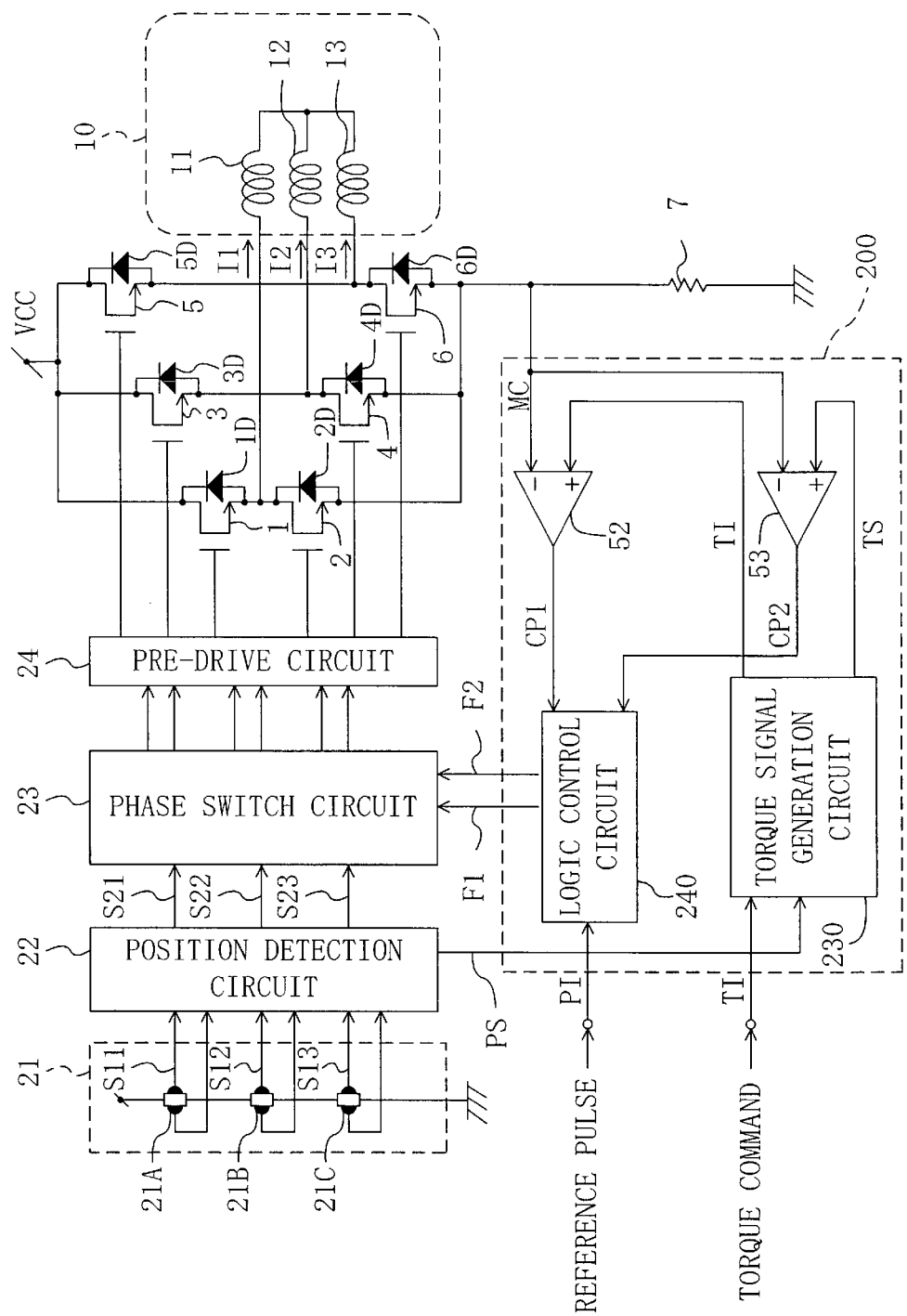
FIG. 11 is a block diagram of a motor driver of Embodiment 2 of the present invention.

FIG. 11 is a block diagram of a motor driver of Embodiment 2 of the present invention. The motor driver of FIG. 11 includes a torque signal generation circuit 230, a logic control circuit 240, a first comparator 52 and a second comparator 53, in place of the torque signal generation circuit 30, the logic control circuit 40 and the comparator 51 in the motor driver of FIG. 1. The other components of the motor driver of this embodiment are the same as those described in Embodiment 1. Therefore, these components are denoted by the same reference numerals and the description thereof is omitted here. The torque signal generation circuit 230, the logic control circuit 240, the first comparator 52 and the second comparator 53 constitute an ON-period control section 200.

Referring to FIG. 11, as the torque signal generation circuit 30 in FIG. 3, the torque signal generation circuit 230 generates the signal TS indicating the voltage corresponding to the target value of the current to flow to the current detection resistance 7, based on the position signal PS and the torque command voltage TI. The torque signal generation circuit 230 outputs the torque command voltage TI and the signal TS to the positive input terminals of the comparators 52 and 53, respectively. The torque command voltage TI may be input into the comparator 52 directly, not via the torque signal generation circuit 230.

A voltage generated at the current detection resistance 7 (source potential at the drive transistors 2, 4 and 6) is input into negative input terminals of the comparators 52 and 53 as the motor current detection signal MC. The comparators 52 and 53 send their outputs CP1 and CP2 to the logic control circuit 240. The logic control circuit 240 receives the reference pulse PI in addition to the signals CP1 and CP2, generates the switching control signals F1 and F2 for defining the time periods during which the drive transistors 1 to 6 are kept ON, and outputs the signals to the phase switch circuit 23.

Figure 12:
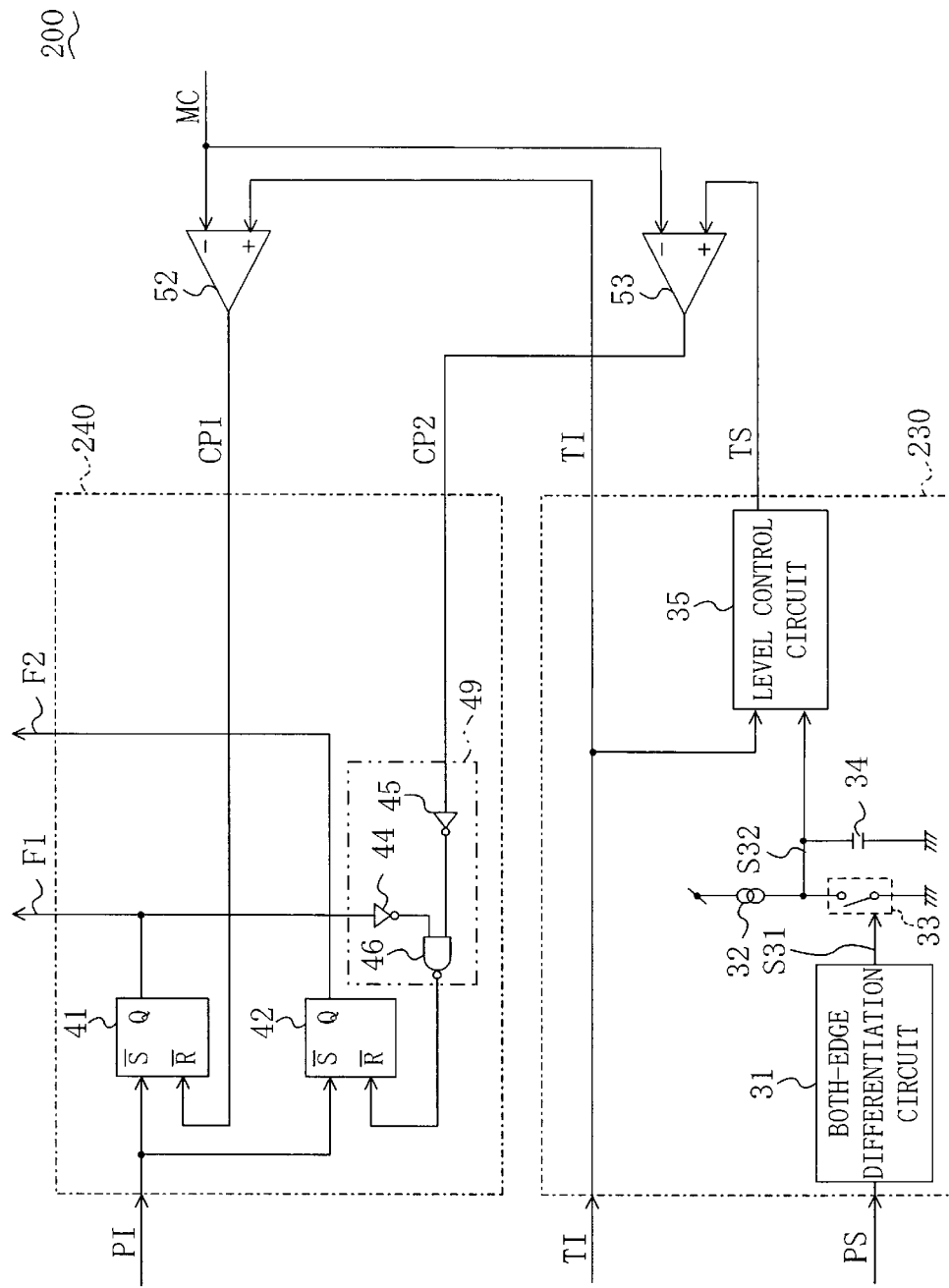
FIG. 12 is a block diagram of an example of an ON-period control section in FIG. 11.
Figure 13:
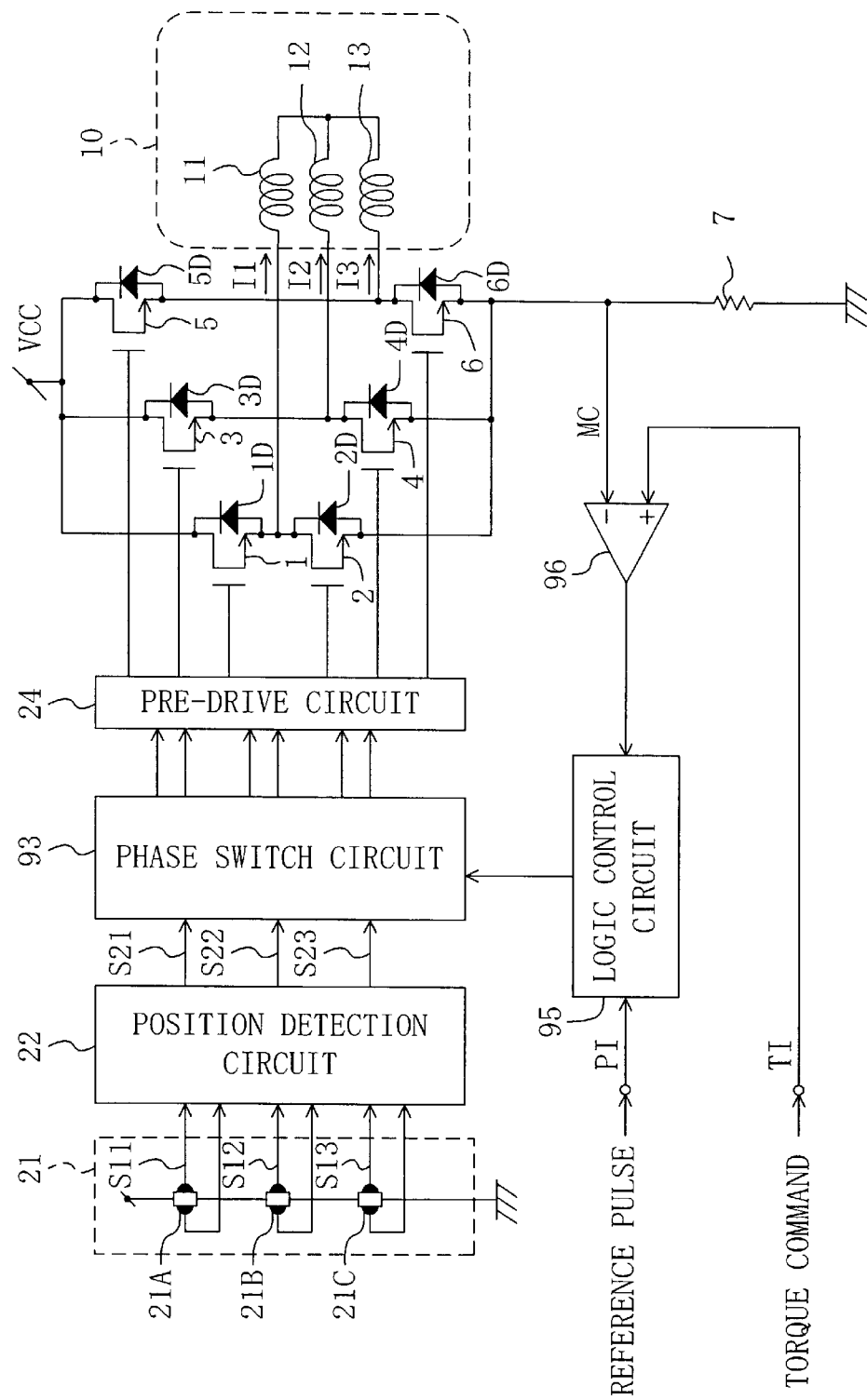
FIG. 13 is a block diagram of a conventional motor driver of the peak current detecting method.
Figure 14:
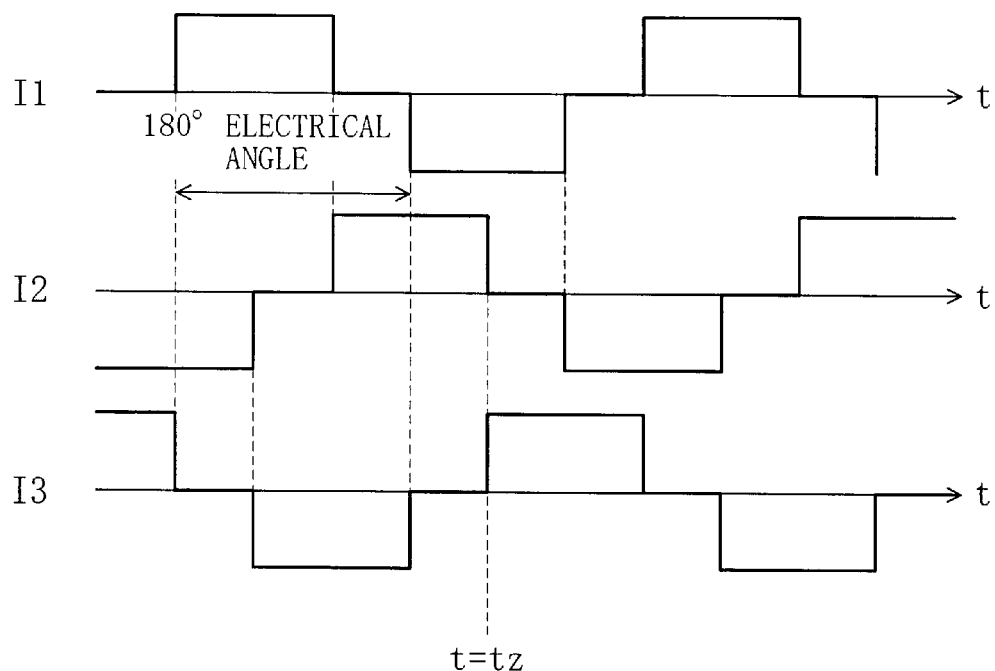
FIG. 14 is a graph showing changes with time of phase currents for a motor driven by the motor driver of FIG. 13.
Figure 15:
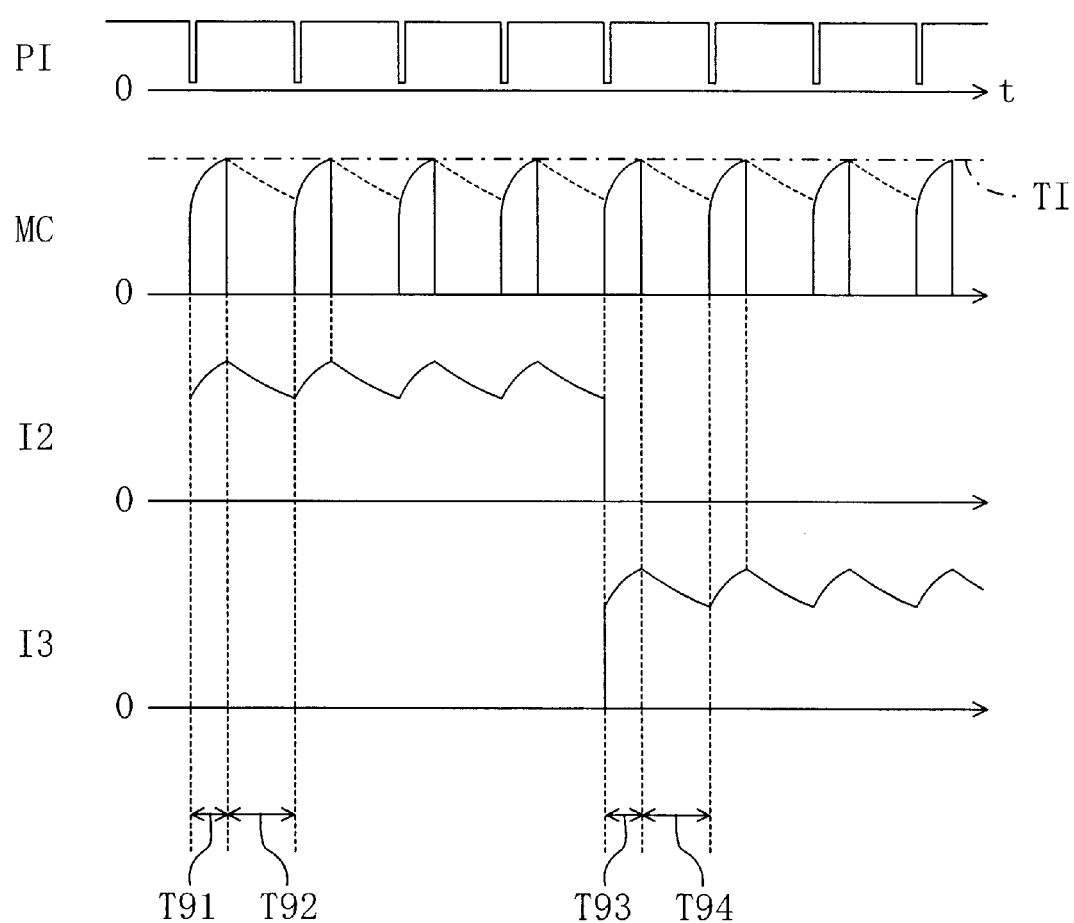
FIG. 15 is a graph showing a current detection resistance voltage and V-phase and W-phase currents at and around time t=tz in FIG. 14, obtained by enlarging the time axis.

FIG. 12 is a block diagram of an example of the ON-period control section 200 in FIG. 11, including the torque signal generation circuit 230, the logic control circuit 240 and the comparators 52 and 53. The torque signal generation circuit 230 in FIG. 12 includes a both-edge differentiation circuit 31, a constant-current source 32, a switch 33, a capacitor 34 and a level control circuit 35. The torque signal generation circuit 230 has the same configuration as that of the torque signal generation circuit 30 in FIG. 3, except that in this embodiment the torque command voltage TI and the output TS of the level control circuit 35 shown in FIG. 4 are directly output to the comparators 52 and 53.

The logic control circuit 240 in FIG. 12 includes a RS flipflop 41 as the first latch, a second RS flipflop 42 as the second latch, inverters 44 and 45 and a NAND gate 46. The inverters 44 and 45 and the NAND gate 46 operate as a logic circuit 49.

The operation of the logic control circuit 240 and the currents flowing to the motor 10 will be described with reference to FIGS. 5 and 12. The reference pulse PI is input into the set terminals of the RS flipflops 41 and 42 in FIG. 12. Upon falling of the reference pulse PI, the RS flipflops 41 and 42 are set, turning both the control signals F1 and F2 to "H". When the control signal F1 is "H", the output of the inverter 44 is "L" and thus the output of the NAND gate 46 is "H". Therefore, the RS flipflop 42 is not reset irrespective of the level of the output CP2 of the comparator 53.

Assume that the operation is currently in the period TU1 in FIG. 2. When both the control signals F1 and F2 become "H", the phase switch circuit 23 turns ON the drive transistors 4 and 6 (first period T1), to allow both the V-phase current I2 and the W-phase current I3 flowing through the V-phase coil 12 and the W-phase coil 13, respectively, to flow to the current detection resistance 7. A voltage proportional to the magnitude of the current flowing through the current detection resistance 7 is generated at the current detection resistance 7, and the generated voltage is input into the negative input terminals of the comparators 52 and 53 as the motor current detection signal MC.

The motor current detection signal MC gradually increases. Once the voltage of the motor current detection signal MC reaches the voltage of the signal TI, the comparator 52 changes the output CP1 to "L". This resets the RS flipflop 41, and thus turns the output thereof, that is, the control signal F1 to "L". The output of the inverter 44 is then turned to "H". Thus, the RS flipflop 42 is ready to be reset upon change of the level of the output CP2 of the comparator 53.

With the control signals F1 and F2 being "L" and "H", respectively, the phase switch circuit 23 turns OFF the drive transistor 4 while the drive transistor 6 is kept ON (second period T2). During this period, only the current flowing through the W-phase coil 13 flows to the current detection resistance 7. Therefore, the current flowing through the W-phase coil 13 can be detected without influence of the current flowing through the V-phase coil 12.

Since the drive transistors 1 and 6 are kept ON, the current flowing through the W-phase coil 13 continues increasing, and thus the current flowing to the current detection resistance 7 also continues increasing. Once the voltage of the motor current detection signal MC reaches the voltage of the signal TS output from the torque signal generation circuit 230, the comparator 53 changes the output CP2 to "L". The output of the NAND gate 46 is then turned to "L". This resets the RS flipflop 42 and thus turns the control signal F2 to "L".

With both the control signals F1 and F2 being "L", the phase switch circuit 23 turns OFF the drive transistor 6 in addition to the drive transistor 4 (period T3).

As described above, the motor driver of FIG. 11 can drive the motor 10 as in the motor driver of FIG. 1. In particular, the motor driver of FIG. 11 can operate stably because the comparators 52 and 53 cause no malfunction easily.

In the embodiments described above, the motor driver includes the diodes 1D to 6D. Alternatively, each of the drive transistors 1 to 6 may include a parasitic diode. In other words, a diode may structurally exist in each of the drive transistors 1 to 6.

Transistors other than the n-type MOS transistors may be used as the drive transistors 1 to 6.

In the above embodiments, the current detection resistance 7 was provided between the sources of the lower side transistors 2, 4 and 6 and the ground. Alternatively, the current detection resistance may be provided between the power supply VCC and the drains of the upper side transistors 1, 3 and 5.

In the above embodiments, the electrical angle 360° of the motor 10 was divided into six parts and the time period corresponding to each part was used as a unit for the control. Alternatively, the electrical angle may be divided into 12 parts, for example, to switch the ON-phase every shorter time period.

The Y connection was adopted for the motor in the above embodiments. Alternatively, delta connection may be adopted.

In the above embodiments, the drive transistor for a phase among the transistors for the two phases to be switched, for which the current should be reduced in magnitude, was turned OFF first. Alternatively, if the signal TS is a sawtooth wave rising sharply and falling slowly, the drive transistor for a phase for which the current should be increased in magnitude may be turned OFF first. In this case, also, the operation described above is possible.

The order of the three phases of the phase currents from ahead to behind was the U phase, the V phase and the W phase. The present invention is also applicable to the case of adopting the order of the W phase, the V phase and the U phase to reverse the rotation of the motor.

The drive of the 3-phase motor was described in the above embodiments, but the present invention is also applicable to drive of a motor of four or more phases.

The Hall sensors were used for position detection in the above description. However, use of Hall sensors is not necessarily a requisite. For example, a CR filter circuit may be provided for each of the U, V and W phases, to filter a harmonic content of a PWM drive current. The output of the filter and the median potential at a coil of the motor may be compared for each phase, to detect the position of a rotor of the motor. However, in consideration of malfunction that may occur due to the harmonic content of the PWM drive current, use of Hall sensors is more advantageous.

Thus, according to the motor driver of the present invention, the phase currents are prevented from sharp change, and thus vibration of the motor and generation of noise during phase switch can be suppressed. For control of currents of a plurality of phases, a plurality of current detection resistances are conventionally required. According to the present invention, however, the control can be performed using only one current detection resistance. This reduces the scale of the device.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

What is claimed is:

1. A motor driver having a plurality of output circuits each including an upper side switching element and a lower side switching element connected in series, for supplying a current to a motor from a connection point between the upper side switching element and the lower side switching element of each output circuit, the motor driver comprising:

a current detection resistance connected in series with the plurality of output circuits in common for detecting a current supplied to the plurality of output circuits;

a position detection section for outputting a position signal corresponding to the position of a rotor of the motor;

a phase switch circuit for selecting one switching element of one of the plurality of output circuits according to the position signal and turning ON the selected switching element for a time period corresponding to a predetermined electrical angle, and switching lower side switching elements of a plurality of output circuits among the remaining ones of the plurality of output circuits when the selected switching element is an upper side switching element while switching upper side switching elements of a plurality of output circuits among the remaining ones of the plurality of output circuits when the selected switching element is a lower side switching element; and an ON-period control section for generating a switching control signal for controlling the switching operation by the phase switch circuit according to an input torque command signal and a voltage generated at the current detection resistance so that each of a plurality of periods obtained by dividing the time period corresponding to the predetermined electrical angle includes a first period in which a plurality of switching elements among the switching elements to be switched are turned ON and a second period in which one of the plurality of switching elements turned ON in the first period is kept ON, and outputting the generated signal.

2. The motor driver of claim 1, wherein the ON-period control section comprises:

a torque signal generation circuit for generating a first target signal corresponding to a target value of a current that should flow to the current detection resistance during the first period, according to the torque command signal, and a second target signal corresponding to a target value of a current that should flow to the current detection resistance during the second period, determined according to the torque command signal and the position signal;

a comparator for determining whether or not the voltage generated at the current detection resistance exceeds the output of the torque signal generation circuit and outputting the result; and a logic control circuit for generating the switching control signal according to a reference pulse for defining the period of the switching operation and the output of the comparator and outputting the generated signal, wherein the logic control circuit generates the switching control signal so that the first period is terminated when the comparator determines that the voltage generated at the current detection resistance has exceeded the output of the torque signal generation circuit for the first period and that the second period is terminated when the comparator determines that the voltage generated at the current detection resistance has exceeded the output of the torque signal generation circuit for the second period, and outputs the generated signal.

3. The motor driver of claim 2, wherein the logic control circuit comprises:

a first latch set with the reference pulse and reset with the output of the comparator;

a second latch set with the reference pulse; and a logic circuit receiving the output of the first latch and the output of the comparator for supplying the resultant output to the second latch as a reset input, the logic control circuit outputting the outputs of the first latch and the second latch as the switching control signal, wherein the first latch is reset when the output of the comparator indicates that the voltage generated at the current detection resistance has exceeded the first target signal, the logic circuit outputs the output of the comparator when the output of the first latch indicates that the first latch has been reset, and does not output the output of the comparator when the output of the first latch indicates that the first latch has not been reset, and the second latch is reset when the logic circuit outputs the output of the comparator and the output of the comparator indicates that the voltage generated at the current detection resistance has exceeded the second target signal.

4. The motor driver of claim 3, wherein the logic control circuit further comprises a delay circuit for outputting the output of the first latch delayed by a predetermined time, wherein the first latch supplies the output to the logic circuit via the delay circuit.

5. The motor driver of claim 1, wherein the ON-period control section comprises:

a torque signal generation circuit for outputting a first target signal corresponding to a target value of a current that should flow to the current detection resistance during the first period, according to the torque command signal, and a second target signal corresponding to a target value of a current that should flow to the current detection resistance during the second period, determined according to the torque command signal and the position signal;

a first comparator for determining whether or not the voltage generated at the current detection resistance has exceeded the first target signal and outputting the result;

a second comparator for determining whether or not the voltage generated at the current detection resistance has exceeded the second target signal and outputting the result; and a logic control circuit for generating the switching control signal according to a reference pulse for defining the period of the switching operation and the outputs of the first and second comparators and outputting the generated signal, wherein the logic control circuit generates the switching control signal so that the first period is terminated when the first comparator determines that the voltage generated at the current detection resistance has exceeded the first target signal and that the second period is terminated when the second comparator determines that the voltage generated at the current detection resistance has exceeded the second target signal, and outputs the generated signal.

6. The motor driver of claim 5, wherein the logic control circuit comprises:

a first latch set with the reference pulse and reset with the output of the first comparator;

a second latch set with the reference pulse; and a logic circuit receiving the output of the first latch and the output of the second comparator for supplying the resultant output to the second latch as a reset input, the logic control circuit outputting the outputs of the first and second latches as the switching control signal, wherein the first latch is reset when the output of the first comparator indicates that the voltage generated at the current detection resistance has exceeded the first target signal, the logic circuit outputs the output of the second comparator when the output of the first latch indicates that the first latch has been reset, and does not output the output of the second comparator when the output of the first latch indicates that the first latch has not been reset, and the second latch is reset when the logic circuit outputs the output of the second comparator and the output of the second comparator indicates that the voltage generated at the current detection resistance has exceeded the second target signal.

7. The motor driver of claim 2 or 5, wherein the period of the reference pulse is roughly constant.

8. The motor driver of claim 2 or 5, wherein the torque signal generation circuit uses a voltage corresponding to the torque command signal as the first target signal, and generates a sawtooth wave having a period equal to the time period corresponding to the predetermined electrical angle and having a peak value roughly equal to the first target signal based on the position signal and the first target signal and uses the sawtooth wave as the second target signal.

9. The motor driver of claim 1, wherein the ON-period control section generates a signal for controlling the switching operation so that the switching element to be kept ON in the second period among the plurality of switching elements to be turned ON in the first period is kept OFF until a lapse of a predetermined time after start of the first period, and outputs the signal as the switching control signal.

10. A motor drive method for a motor driver having a plurality of output circuits each including an upper side switching element and a lower side switching element connected in series, and a current detection resistance connected in series with the plurality of output circuits in common for detecting a current supplied to the plurality of output circuits, the motor driver supplying a current to a motor from a connection point between the upper side switching element and the lower side switching element of each output circuit, the motor drive method comprising the steps of:

determining a position signal corresponding to the position of a rotor of the motor;

selecting one switching element of one of the plurality of output circuits according to the position signal and turning ON the selected switching element for a time period corresponding to a predetermined electrical angle; and switching lower side switching elements of a plurality of output circuits among the remaining ones of the plurality of output circuits when the selected switching element is an upper side switching element while switching upper side switching elements of a plurality of output circuits among the remaining ones of the plurality of output circuits when the selected switching element is a lower side switching element, the switching operation being controlled according to an input torque command signal and a voltage generated at the current detection resistance so that each of a plurality of periods obtained by dividing the time period corresponding to the predetermined electrical angle includes a first period in which a plurality of switching elements among the switching elements to be switched are turned ON and a second period in which one of the plurality of switching elements turned ON in the first period is kept ON.

* * * * *